(12) United States Patent
Tian

(10) Patent No.: US 9,239,640 B2
(45) Date of Patent: Jan. 19, 2016

(54) TOUCH SCREEN, ELECTRONIC EQUIPMENT AND METHOD OF PREVENTING LIGHT LEAKAGE OF A TOUCH SCREEN

(71) Applicant: Sony Corporation, Tokyo (JP)

(72) Inventor: Xiyong Tian, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/199,147

(22) Filed: Mar. 6, 2014

(65) Prior Publication Data

US 2015/0132530 A1    May 14, 2015

(30) Foreign Application Priority Data

Nov. 14, 2013  (CN) .......................... 2013 1 0566468

(51) Int. Cl.
*B32B 3/00* (2006.01)
*G06F 3/0354* (2013.01)
(52) U.S. Cl.
CPC ..... *G06F 3/03547* (2013.01); *Y10T 428/24802* (2015.01)

(58) Field of Classification Search
CPC .................... G06F 3/03547; Y10T 428/24802
See application file for complete search history.

(56) References Cited

U.S. PATENT DOCUMENTS

2013/0313672 A1*  11/2013  Min ............................. 257/434

* cited by examiner

*Primary Examiner* — Elizabeth Mulvaney
(74) *Attorney, Agent, or Firm* — Renner, Otto, Boisselle & Sklar, LLP

(57) ABSTRACT

The embodiment of the present invention provides a touch screen, an electronic equipment and a method of preventing light leakage of a touch screen, wherein the touch screen comprises a substrate and a plurality of printing layers, the plurality of printing layers at least include a first printing layer adjacent to the substrate and a second printing layer adjacent to the first printing layer; the touch screen further includes an additional printing layer which covers at least an area of the second printing layer that is not covered by other printing layers of the plurality of printing layers, wherein color of the additional printing layer is the same with that of the first printing layer. The additional printing layer arranged in the touch screen and having the same color with the first printing layer can effectively prevent light leakage of the touch screen, and can avoid occurrence of color difference and enhance display effect.

10 Claims, 2 Drawing Sheets

TOUCH SCREEN, ELECTRONIC EQUIPMENT AND METHOD OF PREVENTING LIGHT LEAKAGE OF A TOUCH SCREEN

CROSS-REFERENCE TO RELATED APPLICATION AND PRIORITY CLAIM

This application claims priority from Chinese patent application No. 201310566468.2, filed Nov. 14, 2013, the entire disclosure of which hereby is incorporated by reference.

FIELD OF INVENTION

The present invention relates to communication field, and particularly relates to a touch screen, an electronic equipment and a method of preventing light leakage of a touch screen.

BACKGROUND OF THE PRESENT INVENTION

At present, with the development of communication technology, electronic equipments such as mobile phones, tablet PC (tablet personal computer) and the like are widely used, and a touch screen is one of important components of these electronic equipments. Surface of a touch screen generally has a substrate for protecting internal structure of the screen, wherein it is usually necessary to provide printing layers within the substrate to seal mechanical structures. When the printing layers have larger width, light leakage may occur on the touch screen. A user can see clear printing lines from the front of the screen, which affect display effect.

SUMMARY OF THE INVENTION

The embodiment of the present invention provides a touch screen, an electronic equipment and a method of preventing light leakage of a touch screen. The present invention can effectively prevent light leakage of the touch screen, and can avoid occurrence of color difference and enhance display effect.

According to a first aspect of an embodiment of the present invention, a touch screen is provided, wherein the touch screen may include a substrate and a plurality of printing layers, the plurality of printing layers may include a first printing layer adjacent to the substrate and a second printing layer adjacent to the first printing layer; the touch screen further may include an additional printing layer which at least covers an area of the second printing layer that is not covered by other printing layers of said plurality of printing layers, wherein color of the additional printing layer is the same with that of the first printing layer.

According to another aspect of an embodiment of the present invention, an electronic equipment is provided, wherein the electronic equipment may include the touch screen according to the above first aspect.

According to another aspect of an embodiment of the present invention, a method of preventing light leakage of the touch screen is provided, wherein the method includes printing in sequence on a substrate, a plurality of printing layers which includes a first printing layer adjacent to said substrate and a second printing layer adjacent to said first printing layer; and printing an additional printing layer at least on an area of said second printing layer that is not covered by other printing layers of said plurality of printing layers, wherein color of said additional printing layer is the same with that of said first printing layer.

An advantage of the embodiments of the present invention is that an additional printing layer having the same color as the first printing layer effectively prevents light leakage of the touch screen, and avoids occurrence of color difference and enhances display effect.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the present invention, corresponding portions of the drawings may be enlarged or reduced. Elements and features depicted in one drawing or embodiment of the present invention may be combined with elements and features depicted in one or more additional drawings or embodiments. Moreover, in the drawings, like reference numerals designate corresponding parts throughout the several views and may be used to designate like or similar parts in more than one embodiment, and "primed" reference numerals represent elements that are the same or similar to elements that are designed by the same unprimed reference numeral, and so on.

In the drawings.

DETAILED DESCRIPTION OF THE EMBODIMENTS

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smart phones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

The preferred embodiments of the present invention are described as follows with reference to the drawings.

Embodiment 1

Figure 1:
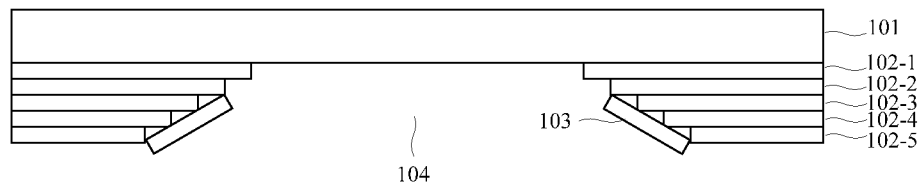
FIG. 1 is a schematic diagram of the structure of the touch screen of Embodiment 1 of the present invention.

An embodiment of the present invention provides a touch screen, and FIG. 1 is a schematic diagram of the structure of the touch screen. As shown in FIG. 1, the touch screen 100 includes a substrate 101 and a plurality of printing layers 102-1, 102-2, . . . 102-n, n≥2, wherein the plurality of printing layers 102-1, 102-2, . . . 102-n at least include a first printing layer 102-1 adjacent to the substrate 101 and a second printing layer 102-2 adjacent to the first printing layer 102-1; the touch screen 100 further includes an additional printing layer 103 which covers at least an area of the second printing layer 102 that is not covered by other printing layers in the plurality of printing layers, wherein color of the additional printing layer 103 is the same with that of the first printing layer 102-1.

In this embodiment, material of the substrate can be any one of existing transparent materials, such as glass, Polymethyl Methacrylate (PMMA) and so on. The embodiment of the present invention has no limitation to the material of the substrate.

In this embodiment, taking n=5 as an example, that is, the plurality of printing layers are in sequence a first printing layer 102-1, a second printing layer 102-2, a third printing layer 102-3, a fourth printing layer 102-4 and a fifth printing layer 102-5, but the embodiment of the present invention is not limited by the number of the plurality of printing layers.

In this embodiment, color of the first printing layer 102-1 is the same as that of the additional printing layer 103. For example, both of the first printing layer 102-1 and the additional printing layer 103 may be a white-color printing layer or pink-color printing layer. In addition, for example, the color of the third printing layer 102-3 and the fourth printing layer 102-4 can be the same with the color of the first printing layer 102-1 and the second printing layer 102-2, but the embodiment of the present invention has no limitation to this.

As shown in FIG. 1, structure of the plurality of printing layers is similar to that of an existing touch screen. The plurality of printing layers 102-1, 102-2, . . . 102-5 are arranged symmetrically at two sides of the substrate 101, with the width being reduced sequentially from the first printing layer 102-1 to form a display area 104 between the plurality of printing layers at the two sides. The printing layer 102-1 may be a printing layer having any color except black or gray. In an existing touch screen, as the width of each of the plurality of printing layers is reduced in sequence, overall thickness of the plurality of printing layers is reduced stepwise as the layers approach the substrate 101. Light emitted from a display module (not shown in FIG. 1) at a lower side of the touch screen may be leaked after passing through the plurality of printing layers in the step-like thickness, and clear printing lines can be seen from an edge of the front of the screen.

The embodiment provides the additional printing layer 103 which covers at least an area of the second printing layer 102 that is not covered by other printing layers of said plurality of printing layers, so that the thickness of the portion of the plurality of printing layers close to the substrate changes uniformly. The result is that the layers effectively prevent light leakage of the touch screen and avoid occurrence of printing lines at the edge of the screen. In addition, the additional printing layer 103 may have the same color as that of the first printing layer 101, so as to be capable of avoiding occurrence of color difference and enhancing display effect.

In one implementation of this embodiment, the outermost printing layer away from the substrate 101 in the plurality of printing layers, namely the fifth printing layer 102-5 may be arranged to be a gray-color printing layer or a black-color printing layer, so as to be capable of preventing light leakage of the touch screen further.

In addition, in this implementation mode, the additional printing layer 103 may further cover areas of the third printing layer 102-3 and the fourth printing layer 102-4 between the second printing layer 102-2 and the outermost printing layer 102-5 that are not covered by other printing layers. In other words, the additional printing layer 103 may cover areas of the second printing layer 102-2, the third printing layer 102-3 and the fourth printing layer 102-4 that are not covered by other printing layers. In this way, overall thickness of the plurality of printing layers may change uniformly from the first printing layer 102-1 to the fifth printing layer 102-5, so as to be capable of preventing light leakage of the touch screen and enhancing display effect further.

In this embodiment, the width D of the additional printing layer 103 can correspond to the width of an area of the second printing layer 102-2 that is not covered by other printing layers, or to the width of areas of the second printing layer 102-2, the third printing layer 102-3 and the fourth printing layer 102-4 that are not covered by other printing layers. For example, the width D of the additional printing layer 103 can be arranged within 0.5 mm~1.0 mm, but the embodiment of the present invention has no limitation to the width of the additional printing layer.

In this embodiment, the additional printing layer 103 has a distance from the first printing layer 102-1 in the width direction between end portions close to a side of a display area of the touch screen, that is, the additional printing layer 103 does not cover an area of the first printing layer 102-1 that is not covered by the second printing layer 102-2, which can avoid occurrence of two fractal lines or dividing lines affecting the display of a user interface. The embodiment of the present invention has no limitation to size d of the distance, which corresponds to the width of the area of the first printing layer 102-1 that is not covered by the second printing layer 102-2, for example, the width of the area of the first printing layer 102-1 that is not covered by the second printing layer 102-2 is 0.2 mm, then the size d of the distance can be arranged to be about 0.2 mm.

In this embodiment, the plurality of printing layers 102-1, 102-2, . . . 102-n and the additional printing layer 103 can be printed by using any existing method, and the embodiment of the present invention has no limitation to the printing method of the printing layers.

It can be seen from the above embodiment that, the additional printing layer arranged in the touch screen and having the same color with the first printing layer can effectively prevent light leakage of the touch screen, and can avoid occurrence of color difference and enhance display effect.

Embodiment 2

Figure 2:
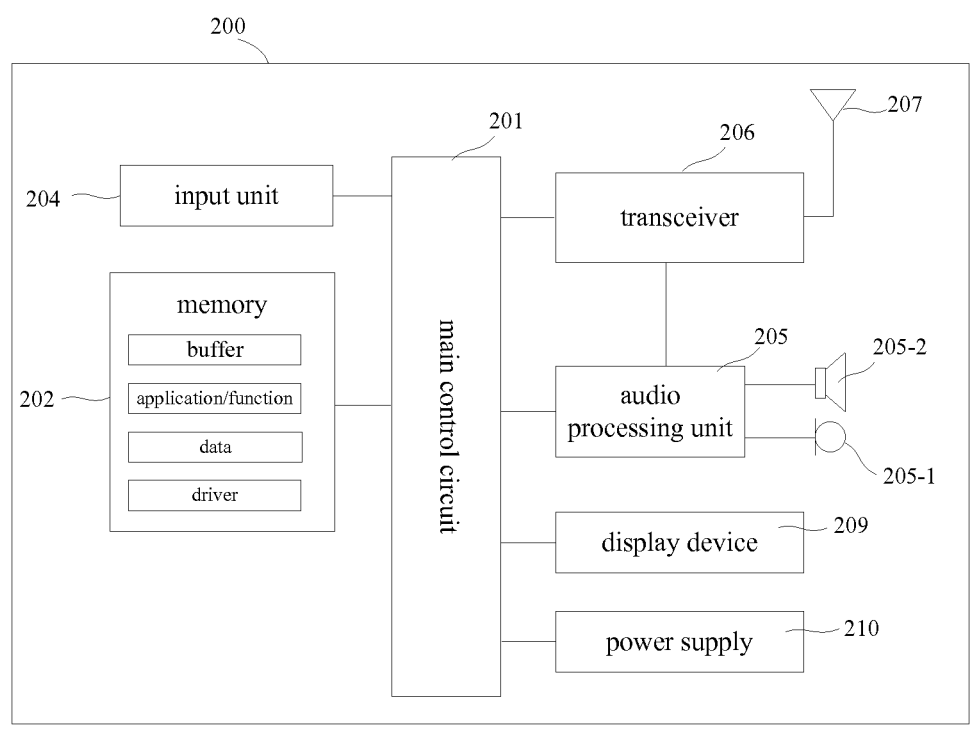
FIG. 2 is a schematic diagram of the structure of the electronic equipment of Embodiment 2 of the present invention.

FIG. 2 is a schematic diagram of the structure of the electronic equipment of the embodiment, the electronic equipment can be for example a mobile phone, and this figure is only exemplary. The mobile phone 200 further can include other types of circuit components to supplement or substitute the operating circuit to realize communication function or other functions. The mobile phone 200 does not have to include all components shown in FIG. 2.

As shown in FIG. 2, the mobile phone 200 includes a main control circuit 201, a transceiver 206, an input unit 204, an audio processing unit 205, a microphone 205-1, a speaker 205-2, a memory 202, a display device 209, a power supply 210 and an antenna 207. The display device 209 includes a touch screen 209-1 and a display module 209-2. The structure of the touch screen has been described in detail in the Embodiment 1, and structure and function of the display module 209-2 are similar to that of an existing display module and thus will not be repeated herein.

The main control circuit 201 is sometimes referred to as a controller or an operating control, which can include a microprocessor or other processing devices and/or logic devices. The main control circuit 201 receives inputs and controls operations of components of the mobile phone 200.

The memory 202 can be one or more of, for example, a buffer, a flash memory, a hard drive, a removable media, a volatile memory, a nonvolatile memory or other suitable devices, which can store and execute applications/functions. In addition, the main control circuit 201 can execute functions stored in the memory 202. Other components have functions similar to that of existing components and thus are not repeated herein.

The components of the mobile phone 200 can be implemented by a special hardware, a firmware, software or combination thereof, without departure from the scope of the present invention.

It can be seen from the above embodiment that, the additional printing layer arranged in the touch screen of the electronic equipment and having the same color as the first printing layer can effectively prevent light leakage of the touch screen, and can avoid occurrence of color difference and enhance display effect.

The embodiment of the present invention further provides a method of preventing light leakage of a touch screen. According to the following Embodiment 3, principles of the method to solve problems are similar to functions of the components of the touch screen of the Embodiment 1, therefore specific implementations can be carried out with reference to implementations of the touch screen of the Embodiment 1, and as a result the same contents will not be repeated herein.

Embodiment 3

Figure 3:
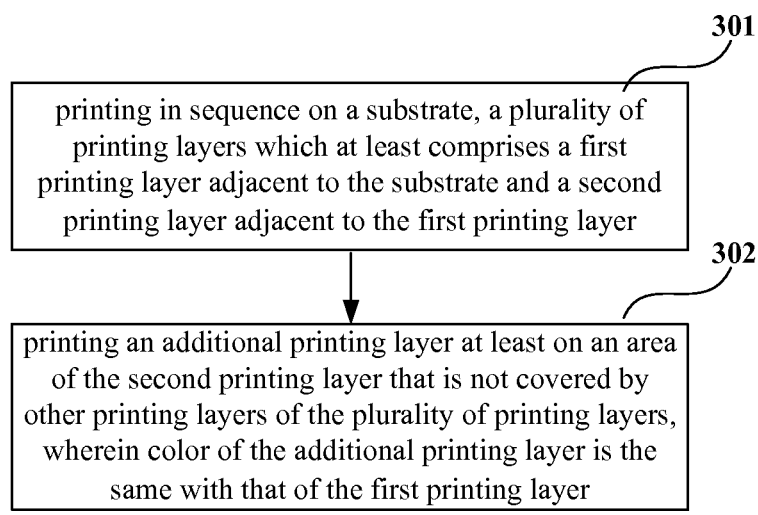
FIG. 3 is a flow chart of the method of preventing light leakage of a touch screen of Embodiment 3 of the present invention.

The embodiment of the present invention further provides a method of preventing light leakage of a touch screen, which is applied to a touch screen. FIG. 3 is a flow chart of the method. As shown in FIG. 3, the method includes:

Step 301: printing in sequence on a substrate, a plurality of printing layers which includes at least a first printing layer adjacent to the substrate and a second printing layer adjacent to the first printing layer;

step 302: printing an additional printing layer at least on an area of the second printing layer that is not covered by other printing layers of the plurality of printing layers, wherein color of the additional printing layer is the same as that of the first printing layer.

In this embodiment, color of the plurality of the printing layers and the additional printing layer, structure and locations of the plurality of printing layers, structure and location of the additional printing layer, and printing method of the plurality of printing layers and the additional printing layer are the same with that are described in the Embodiment 1, and thus are not repeated herein.

For example,

In one embodiment, the method further includes printing a gray-color printing layer or a black-color printing layer on an outermost side away from the substrate in the plurality of printing layers.

In another embodiment, it may be practicable to print an additional printing layer on an area of the second printing layer as well as an area of printing layers between the second printing layer and the outermost printing layer that is not covered by other printing layers of the plurality of printing layers.

In another embodiment, it may be practicable to make width of the additional printing layer be within 0.5 mm~10 mm and make width of each of the plurality of printing layers reduced in sequence from the first printing layer when printing the additional printing layer; and it may be practicable to make the additional printing layer have a distance from the first printing layer in the width direction between end portions close to a side of a display area of the touch screen when printing the additional printing layer.

It can be seen from the above embodiment that, the additional printing layer arranged in the touch screen and having color the same as the first printing layer can effectively prevent light leakage of the touch screen, and can avoid occurrence of color difference and enhance display effect.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above.

The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A touch screen comprising:
    a substrate;
    a plurality of printing layers including a first printing layer adjacent to said substrate and a second printing layer adjacent to said first printing layer;
    an additional printing layer which at least covers an area of said second printing layer that is not covered by other printing layers of said plurality of printing layers,
    wherein said first printing layer and said additional printing layer are the same color.

2. The touch screen according to claim 1, wherein an outermost printing layer away from said substrate in said plurality of printing layers is a gray-color printing layer or a black-color printing layer.

3. The touch screen according to claim 2, wherein said additional printing layer further covers an area of printing layers between said second printing layer and said outermost printing layer that is not covered by other printing layers of said plurality of printing layers.

4. The touch screen according to claim 1, wherein a width of said additional printing layer is within 0.5 mm~1.0 mm.

5. The touch screen according to claim 1, wherein a width of each of said plurality of printing layers is reduced in sequence from said first printing layer, and said additional printing layer has a distance from said first printing layer in the width direction between end portions close to a side of a display area of said touch screen.

6. An electronic equipment comprising said touch screen according to claim 1.

7. A method of preventing light leakage of a touch screen comprising:
   printing in sequence on a substrate, a plurality of printing layers having at least a first printing layer adjacent to said substrate and a second printing layer adjacent to said first printing layer; and
   printing an additional printing layer at least on an area of said second printing layer that is not covered by other printing layers of said plurality of printing layers, wherein color of said additional printing layer is the same as that of said first printing layer.

8. The method according to claim 7, further comprising printing a gray-color printing layer or a black-color printing layer on an outermost side away from said substrate in said plurality of printing layers.

9. The method according to claim 8, wherein said printing the additional printing layer comprises printing an additional printing layer on an area of said second printing layer as well as an area of printing layers between said second printing layer and said outermost printing layer that is not covered by other printing layers of said plurality of printing layers.

10. The method according to claim 7,
   wherein a width of said additional printing layer is within 0.5 mm~1.0 mm and a width of each of said plurality of printing layers is reduced in sequence from said first printing layer when printing said additional printing layer, and
   wherein said additional printing layer has a distance from said first printing layer in the width direction between end portions close to a side of a display area of said touch screen when printing said additional printing layer.

* * * * *